United States Patent
Li et al.

(10) Patent No.: US 12,356,420 B2
(45) Date of Patent: Jul. 8, 2025

(54) MULTI-SLOT TRANSMISSION TIME INTERVAL BASED CHANNEL STATE INFORMATION AND UPLINK SHARED CHANNEL MULTIPLEXING

(71) Applicant: QUALCOMM Incorporated, San Diego, CA (US)

(72) Inventors: Qiaoyu Li, Beijing (CN); Chao Wei, Beijing (CN); Chenxi Hao, Beijing (CN); Yu Zhang, San Diego, CA (US); Jing Lei, San Diego, CA (US); Peter Pui Lok Ang, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/758,121

(22) PCT Filed: Jan. 10, 2020

(86) PCT No.: PCT/CN2020/071281
§ 371 (c)(1),
(2) Date: Jun. 28, 2022

(87) PCT Pub. No.: WO2021/138881
PCT Pub. Date: Jul. 15, 2021

(65) Prior Publication Data
US 2023/0043456 A1    Feb. 9, 2023

(51) Int. Cl.
*H04W 72/12* (2023.01)
*H04L 5/00* (2006.01)
*H04W 72/23* (2023.01)

(52) U.S. Cl.
CPC ........... *H04W 72/23* (2023.01); *H04L 5/0035* (2013.01); *H04L 5/0057* (2013.01)

(58) Field of Classification Search
CPC .................. H04W 72/23; H04W 72/1268; H04L 5/0035; H04L 5/0057
(Continued)

(56) References Cited

U.S. PATENT DOCUMENTS

| | | | |
|---|---|---|---|
| 2018/0167932 A1* | 6/2018 | Papasakellariou | .... H04L 1/1887 |
| 2019/0037585 A1 | 1/2019 | Li et al. | |

(Continued)

FOREIGN PATENT DOCUMENTS

| | | |
|---|---|---|
| CN | 103168441 A | 6/2013 |
| CN | 109644039 A | 4/2019 |

(Continued)

OTHER PUBLICATIONS

CATT: "Remaining Aspects of UCI Multiplexing on PUSCH", 3GPP TSG RAN WG1 Meeting #92bis, R1-1803755, 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 7, 2018, XP051413691, 6 Pages, Section 2.2, pp. 3-5.

(Continued)

*Primary Examiner* — Candal Elpenord
(74) *Attorney, Agent, or Firm* — Harrity & Harrity, LLP

(57) ABSTRACT

Various aspects of the present disclosure generally relate to multi-slot transmission time interval based channel state information (CSI) and uplink shared channel (UL-SCH) multiplexing. In some aspects, a user equipment (UE) may receive a downlink control information (DCI) message and determine, based at least in part on the DCI message, a schedule for multiplexing UL-SCH data and one or more components of uplink control information (UCI) in a plurality of slots on a physical uplink shared channel (PUSCH). The components may include a CSI report for a plurality of transmission reception points. The UE may multiplex the (Continued)

UL-SCH data and the one or more components into the plurality of slots based at least in part on the schedule. Numerous other aspects are provided.

30 Claims, 8 Drawing Sheets

(58) Field of Classification Search
USPC .......................................................... 370/336
See application file for complete search history.

(56) References Cited

U.S. PATENT DOCUMENTS

| | | | |
|---|---|---|---|
| 2019/0349917 A1 | 11/2019 | Huang et al. | |
| 2020/0314815 A1* | 10/2020 | Kim | H04L 1/1671 |
| 2020/0351129 A1* | 11/2020 | Kwak | H04W 80/02 |
| 2020/0351861 A1* | 11/2020 | Mukherjee | H04L 1/1864 |
| 2021/0092762 A1* | 3/2021 | Choi | H04L 1/1887 |
| 2021/0092763 A1* | 3/2021 | Li | H04W 72/569 |

FOREIGN PATENT DOCUMENTS

| | | |
|---|---|---|
| CN | 110139390 A | 8/2019 |
| TW | 201907740 A | 2/2019 |
| WO | 2019051347 A2 | 3/2019 |
| WO | WO-2019064569 A1 | 4/2019 |

OTHER PUBLICATIONS

Supplementary European Search Report—EP20911489—Search Authority—The Hague—Sep. 1, 2023.
Huawei., et al., "CSI Measurement Enhancement for Multi-TRP/Panel Transmission", 3GPP TSG RAN WG1 Meeting #96bis, R1-1903982, Xi'an, China, Apr. 8-12, 2019, Apr. 12, 2019 (Apr. 12, 2019) The Whole Document, 6 Pages, Sections 2-4.
International Search Report and Written Opinion—PCT/CN2020/071281—ISA/EPO—Oct. 12, 2020.
Spreadtrum Communications: "Discussion on CSI Enhancement for Multiple TRP/Panel Transmission", 3GPP TSG RAN WG1 Meeting #97, R1-1906371, Reno, USA, May 13-May 17, 2019, May 17, 2019 (May 17, 2019) Section 2, 4 Pages.

* cited by examiner

MULTI-SLOT TRANSMISSION TIME INTERVAL BASED CHANNEL STATE INFORMATION AND UPLINK SHARED CHANNEL MULTIPLEXING

CROSS-REFERENCE TO RELATED APPLICATION

This application is a 371 national stage of Patent Cooperation Treaty (PCT) Application No. PCT/CN2020/071281 filed on Jan. 10, 2020, entitled "MULTI-SLOT TRANSMISSION TIME INTERVAL BASED CHANNEL STATE INFORMATION AND UPLINK SHARED CHANNEL MULTIPLEXING," which is hereby expressly incorporated by reference herein.

FIELD OF THE DISCLOSURE

Aspects of the present disclosure generally relate to wireless communication and to techniques and apparatuses for multi-slot transmission time interval (TTI) based channel state information (CSI) and uplink shared channel (UL-SCH) multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving a downlink control information (DCI) message and determining, based at least in part on the DCI message, a schedule for multiplexing uplink shared channel (UL-SCH) data and one or more components of uplink control information (UCI) in a plurality of slots on a physical uplink shared channel (PUSCH). The one or more components may include a channel state information (CSI) report for a plurality of transmission reception points. The method may include multiplexing the UL-SCH data and the one or more components into the plurality of slots based at least in part on the schedule.

In some aspects, a method of wireless communication, performed by a base station, may include determining a schedule for a UE to multiplex UL-SCH data and one or more components of UCI in a plurality of slots on a PUSCH. The one or more components may include a CSI report for a plurality of transmission reception points. The method may include transmitting a DCI message that includes the schedule.

In some aspects, a UE for wireless communication may include memory and one or more processors coupled to the memory. For example, the one or more processors may be operatively, electronically, communicatively, or otherwise coupled to the memory. The memory may comprise instructions executable by the one or more processors to cause the UE to receive a DCI message and determine, based at least in part on the DCI message, a schedule for multiplexing UL-SCH data and one or more components of UCI in a plurality of slots on a PUSCH. The one or more components may include a CSI report for a plurality of transmission reception points. The memory may comprise instructions executable by the one or more processors to cause the UE to multiplex the UL-SCH data and the one or more components into the plurality of slots based at least in part on the schedule.

In some aspects, a base station for wireless communication may include memory and one or more processors coupled to the memory. For example, the one or more processors may be operatively, electronically, communicatively, or otherwise coupled to the memory. The memory may comprise instructions executable by the one or more processors to cause the base station to determine a schedule for a UE to multiplex UL-SCH data and one or more components of UCI in a plurality of slots on a PUSCH. The one or more components may include a CSI report for a plurality of transmission reception points. The memory may comprise instructions executable by the one or more processors to cause the base station to transmit a DCI message that includes the schedule.

In some aspects, a non-transitory computer-readable medium may store one or more instructions for wireless communication. The one or more instructions, when executed by one or more processors of a UE, may cause the UE to receive a DCI message and determine, based at least in part on the DCI message, a schedule for multiplexing UL-SCH data and one or more components of UCI in a plurality of slots on a PUSCH, where the one or more components include a CSI report for a plurality of transmission reception points, and multiplex the UL-SCH data and the one or more components into the plurality of slots based at least in part on the schedule.

In some aspects, a non-transitory computer-readable medium may store one or more instructions for wireless communication. The one or more instructions, when executed by one or more processors of a base station, may cause the base station to determine a schedule for a UE to multiplex UL-SCH data and one or more components of UCI in a plurality of slots on a PUSCH, where the one or more components include a CSI report for a plurality of transmission reception points, and transmit a DCI message that includes the schedule.

In some aspects, an apparatus for wireless communication may include means for receiving a DCI message; means for determining, based at least in part on the DCI message, a schedule for multiplexing UL-SCH data and one or more components of UCI in a plurality of slots on a PUSCH, where the one or more components include a CSI report for a plurality of transmission reception points, and means for multiplexing the UL-SCH data and the one or more components into the plurality of slots based at least in part on the schedule.

In some aspects, an apparatus for wireless communication may include means for determining a schedule for a UE to multiplex UL-SCH data and one or more components of UCI in a plurality of slots on a PUSCH, where the one or more components include a CSI report for a plurality of transmission reception points, and means for transmitting a DCI message that includes the schedule.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
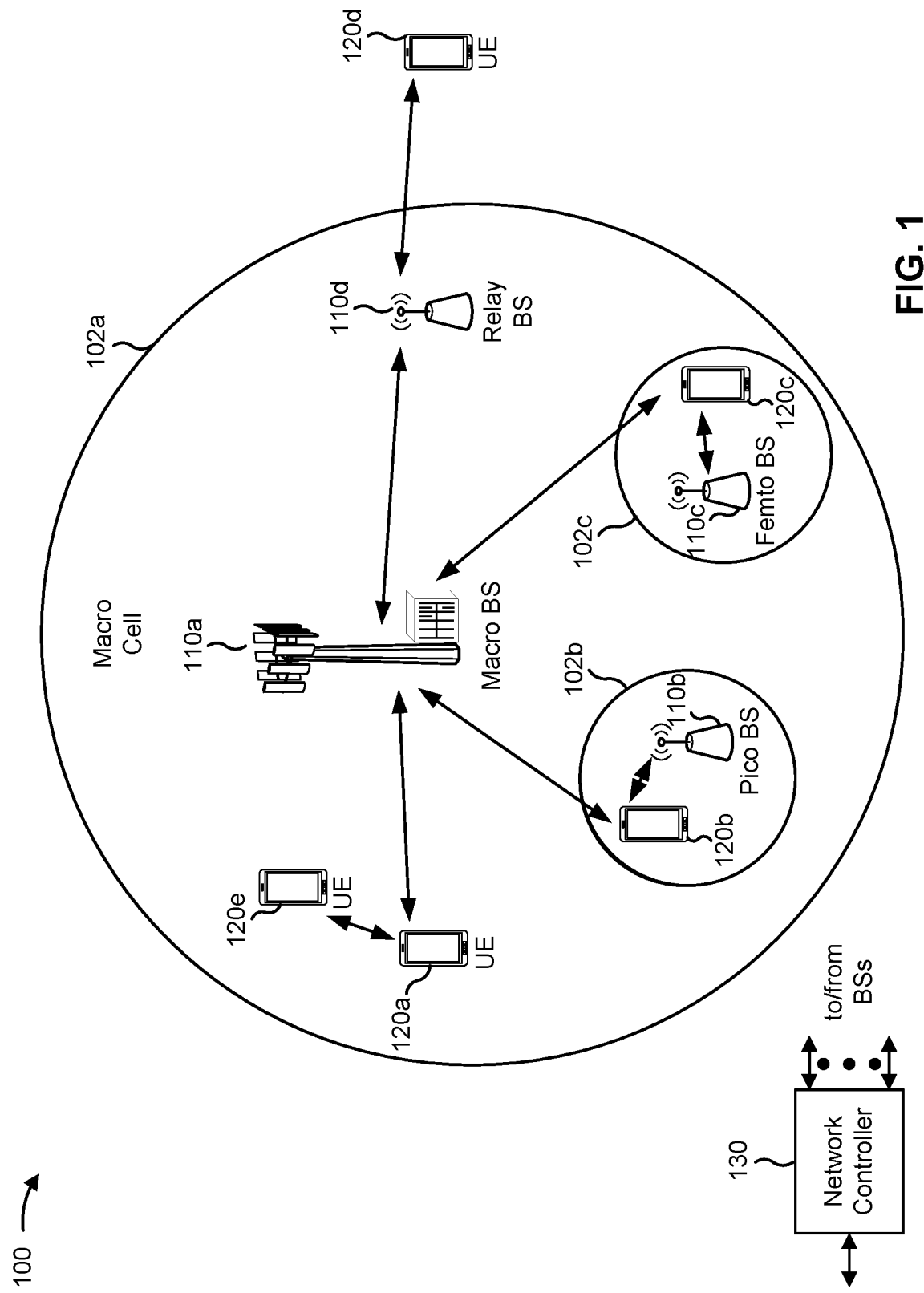
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
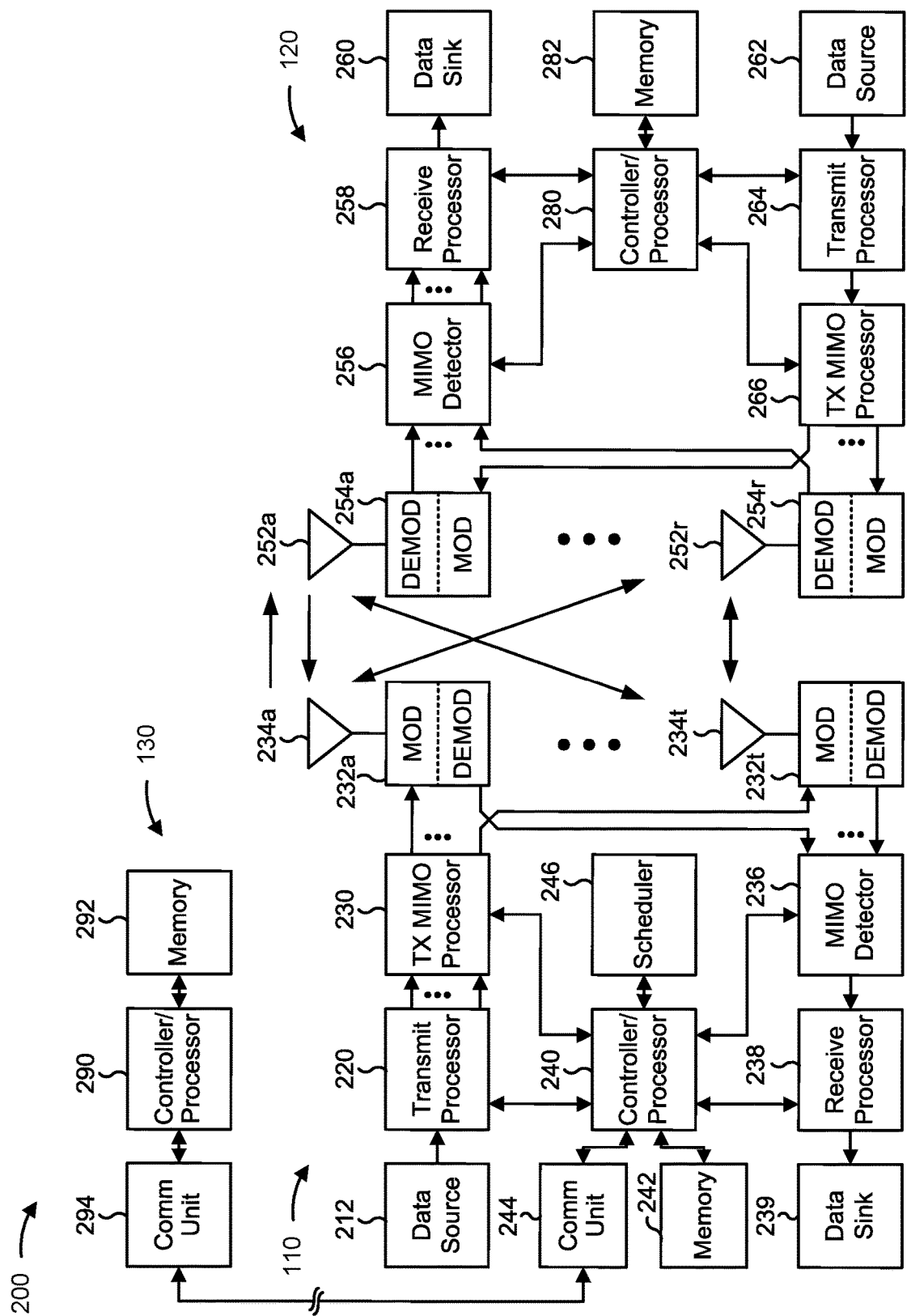
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with multi-slot transmission time interval based channel state information (CSI) and uplink shared channel (UL-SCH) multiplexing, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, UE 120 may include means for receiving a downlink control information (DCI) message, means for determining, based at least in part on the DCI message, a schedule for multiplexing uplink shared channel (UL-SCH) data and one or more components of uplink control information (UCI) in a plurality of slots on a physical uplink shared channel (PUSCH), where the one or more components include a channel state information (CSI) report for a plurality of transmission reception points, means for multiplexing the UL-SCH data and the one or more components into the plurality of slots based at least in part on the schedule, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a schedule for a UE to multiplex UL-SCH data and one or more components of UCI in a plurality of slots on a PUSCH, where the one or more components include a CSI report for a plurality of transmission points, means for transmitting a DCI message that includes the schedule, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Many devices, such as smart wearable devices, industrial sensors, and video surveillance devices, may be designed to operate using NR-Light. NR-Light operations use less transmission power, have less computational complexity, and use fewer antennas as compared to normal NR operations. NR-Light UEs may also use less bandwidth. For example, an NR-Light UE may use bandwidths of 5 MHz-20 MHz as compared to a premium UE that uses a bandwidth of 100 MHz. Networks may be designed so that NR premium UEs may coexist with NR-Light UEs.

A UE may provide uplink control information (UCI) to a base station (e.g., gNB). The UCI may include feedback about a particular transmission, transmission conditions, or other information that the base station may use for scheduling. The UCI may include one or more components. The components may include, for example, an automatic repeat request acknowledgement (HARQ-ACK) and/or a channel state information (CSI) report. The CSI report may include multiple parts, such as a CSI-Part1 and a CSI-Part2. The UE may multiplex UL-SCH data with UCI on a physical uplink shared channel (PUSCH). In another example, the UE may transmit the UCI but no UL-SCH data on the PUSCH.

The UE may use a modulation order to encode the UCI and the UL-SCH data for transmission on the PUSCH. A modulation order of the UCI may be the same as a modulation order of the UL-SCH data, as indicated in an uplink (UL) grant that schedules the PUSCH. If the UL-SCH data is not in the PUSCH, the modulation order may follow the modulation order indicated in the UL grant for the UL-SCH data.

The UE may allocate resource elements (REs) for the components of the UCI. An RE may include, for example, a symbol, a time and frequency resource, and/or the like. The base station may dynamically schedule or indicate a quantity of REs for each component of the UCI. The base station may use parameters called Beta-Offsets to determine a quantity of REs for each component of the UCI. The base station may also use a scaling factor A to alter a ratio of the UCI and the UL-SCH data in the PUSCH. In an example, the UE may first determine a quantity of REs for HARQ-ACK as $Q_{ACK}=\min\{Q_{Beta-ACK}, [A \times Q_{PUSCH}]\}$, where $Q_{Beta-ACK}$ is a quantity of REs determined by the Beta-Offset value for HARQ-ACK. $Q_{PUSCH}$ may be a total quantity of REs of a scheduled PUSCH slot (excluding REs for reference signals). The UE may then determine a quantity of REs for CSI-Part1 and CSI-Part2 as $Q_{Part-1}=\min\{Q_{Beta-Part1}, [A \times Q_{PUSCH}]-Q_{ACK}\}$ and $Q_{Part-2}=\min\{Q_{Beta-Part2}, [A \times Q_{PUSCH}]-Q_{ACK}-Q_{Part1}\}$, where $Q_{Beta-Part1}$ and $Q_{Beta-Part1}$ are a quantity of REs determined by the Beta-Offset values for CSI-Part1 and CSI-Part2, respectively. A quantity of REs that remain for UL-SCH data may be $Q_{UL-SCH}=Q_{PUSCH}-Q_{ACK}-Q_{Part1}-Q_{Part2}$. The UE may sequentially map a payload of UCI components and a payload of UL-SCH data in the quantity of REs determined as above. A scheduling priority for a PUSCH slot may be HARQ-ACK>CSI-report-Part1>CSI-report-Part2>UL-SCH data.

The UE may determine a channel coding rate of a HARQ-ACK according to a quantity of HARQ-ACK information bits, a modulation order, and a quantity of REs for HARQ-ACK (i.e., $Q_{ACK}$). The UE may determine a channel coding rate of a CSI-Part1 to be similar to the channel coding rate of the HARQ-ACK. A CSI-Part2 may have a channel coding rate that depends on whether the UL-SCH data is multiplexed on the PUSCH. If the UL-SCH data is also multiplexed on the PUSCH, $Q_{Beta-Part2}=\lceil(O_{Part2+}L_{Part2}) \times \beta_{Part2} \times Q_{PUSCH}/K_{tot}\rceil$, where $K_{tot}$ is the sum code block size across all the UL-SCH data to be multiplexed onto the PUSCH, $O_{Part2}$ is the CSI-Part2 payload size, $L_{Part2}$ is a quantity of cyclic redundancy check (CRC) bits for the CSI-Part2, and $\beta_{Part2}$ is the Beta_Offset value for the CSI-Part2. If $Q_{Beta-Part2}>[A \times Q_{PUSCH}]-Q_{ACK}-Q_{Part1}$, the CSI-Part2 may be omitted level by level (according to some priority rules), until $Q_{Beta-Part2}\le[A \times Q_{PUSCH}]-Q_{ACK}-Q_{Part1}$. If the UL-SCH data is not multiplexed on the PUSCH, the UE may determine a channel coding rate for CSI-Part2 to be $C_T=C_{MCS}/\beta_{Part2}$, where $C_{MCS}$ is a signaled coding rate in UL grant DCI. If the coding rate for the CSI-Part2 is greater than $C_T$, the CSI-Part2 has to be omitted until the channel coding rate is lower than $C_T$.

NR-Light UEs may need to support high resolution precoding matrix indicator (PMI) reporting (e.g., Type II CSI). An NR-Light UE may be configured for multiple user multiple-input-multiple-output (MU-MIMO), paired with other premium UEs. High resolution PMI reporting may provide better inter-UE interference mitigation. A CSI reporting payload may be large for the NR-Light UE and thus the coding rate may be high. Meanwhile, UL transmission may be limited in coverage due to a reduced quantity of transmissions or a reduced transmission power. This may limit the UL coverage of high resolution CSI reporting.

A UE may provide a CSI report to a base station about channel conditions. If there are multiple transmission reception (TRP) points, there may be multiple CSI reports—a CSI report for each TRP. CSI reporting for downlink multi-TRP and/or multi-panel transmission may enable more dynamic channel/interference hypotheses for non-coherent joint transmission (NCJT), targeting both frequency 1 (FR1) and frequency 2 (FR2) used for NR. This may provide for better interference mitigation. However, CSI reporting for multiple TRPs includes multiple CSI reports. The multiple CSI reports may use additional radio resource configuration (RRC) messages and additional downlink control information (DCI) overhead for triggering the CSI reporting. The payload size of the multiple CSI reports may be large and there may be fewer resources available for UL-SCH data. As a result, the UE may consume extra power and expend extra processing and signaling resources transmitting the multiple CSI reports and the UL-SCH data. The base station may expend additional processing and signaling resources sending multiple DCI messages for scheduling the multiple CSI reports and UL-SCH data.

According to various aspects described herein, a base station may use a single DCI message to schedule UCI and UL-SCH data in multiple slots on the PUSCH. For example, a UE may receive a DCI message and determine, from the DCI message, a schedule for multiplexing UL-SCH data and one or more components of UCI in multiple lots on a PUSCH. The components may include a CSI report for multiple TRPs. As a result, the UE may consume less power, processing, and signaling resources when reporting CSI for multiple TRPs. The UE may achieve more channel coding gain as compared to repetition-based coverage recovery (for NR-Light). The base station may use less DCI overhead to carry out scheduling as compared to separately scheduling multiple PUSCH slots for different CSI reports. The base station may also save processing and signaling resources.

Figure 3:
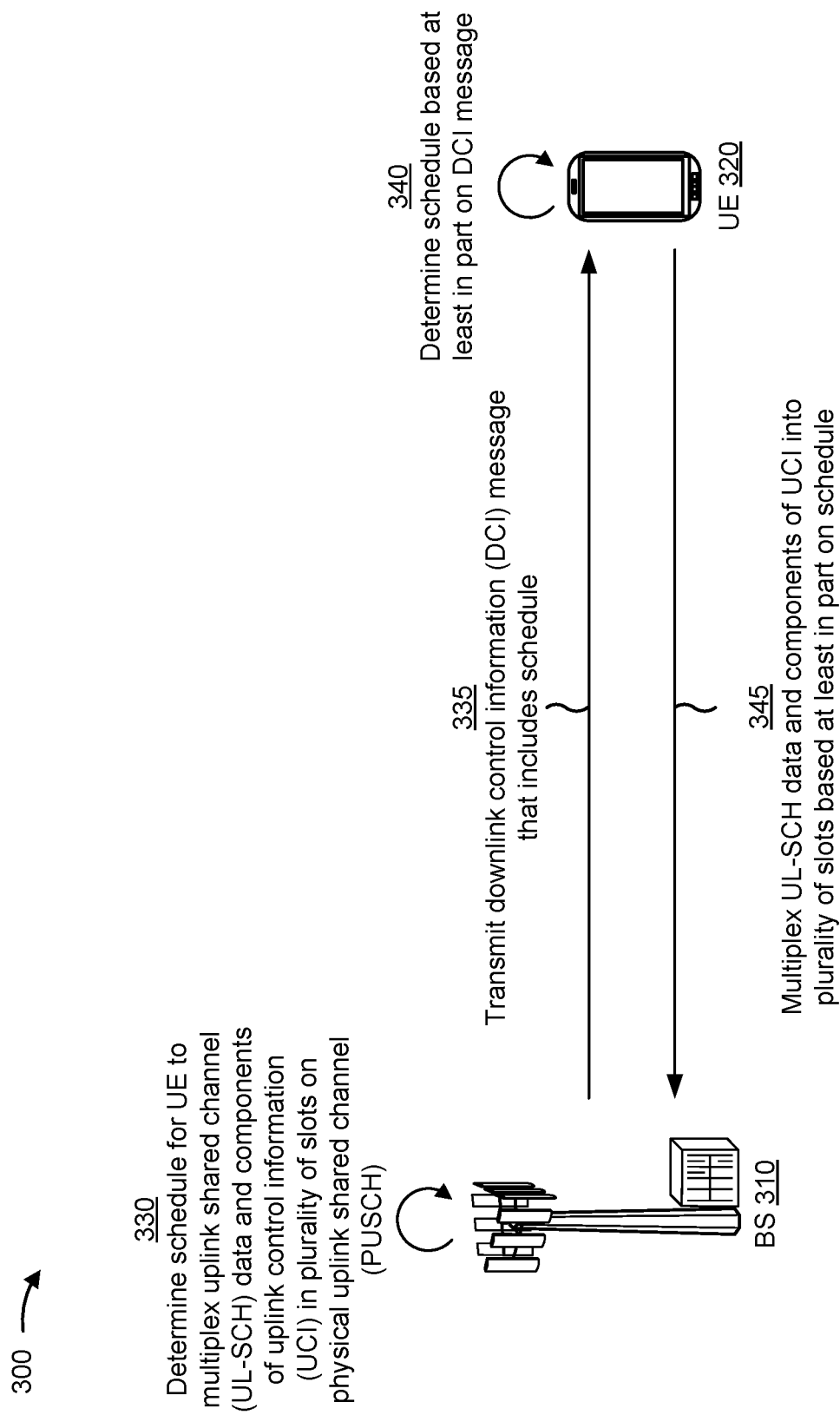
FIG. 3 is a diagram illustrating an example of multi-slot channel state information (CSI) and uplink shared channel (UL-SCH) multiplexing, in accordance with various aspects of the present disclosure.

FIG. 3 is a diagram illustrating an example 300 of multi-slot CSI and UL-SCH multiplexing, in accordance with various aspects of the present disclosure. FIG. 3 shows a base station (BS) 310 (e.g., BS 110 depicted in FIGS. 1 and 2) that may communicate with a UE 320 (e.g., UE 120 depicted in FIGS. 1 and 2).

As shown by reference number 330, BS 320 may determine a schedule for UE 320 to multiplex UL-SCH data and one or more components of UCI in a plurality of slots on the PUSCH. The components of the UCI may include a CSI report for multiple TRPs. In some aspects, the schedule may indicate a position and/or a quantity of REs allocated for each component of the UCI in multiple slots on the PUSCH. As shown by reference number 335, BS 310 may transmit a DCI message that includes the schedule.

As shown by reference number 340, UE 320 may determine the schedule based at least in part on the DCI message. In some aspects, the DCI message may provide information that UE 320 may use to determine the position and/or the quantity of REs for the components. UE 320 may be configured, via a radio resource control (RRC) message, an UL grant in the DCI message, or stored configuration information, to transmit on a PUSCH over multiple slots. The UL grant may include a valid CSI-request indication and/or a negative UL-SCH data transmission indication. UE 320 may be configured, via an RRC message, an UL grant in the DCI message, or stored configuration information, with a quantity of slots to be scheduled. The UE may be configured for multiple slots by an UL grant based at least in part on the UE transmitting UE capability information.

As shown by reference number 345, UE 320 may multiplex the UL-SCH data and the one or more components of the UCI into the plurality of slots based at least in part on the schedule. In some aspects, the UCI may be front-loaded into the multiple slots such that the UCI fills REs in the first slots earlier than the UL-SCH data. UE 320 may determine a quantity of REs for components of the UCI across all the PUSCH slots. When calculating the quantity of the REs for each component of the UCI (instead of using a quantity of the REs in a single slot as a reference), UE 320 may determine a quantity of REs for each component of the UCI based at least in part on a quantity of available REs across all scheduled slots. The UL-SCH data may be allocated to the remaining slots. In some aspects, each slot may have a similar amount of each component of the UCI and the UL-SCH.

In some aspects, each of the multiple slots may have identical structures in terms of orthogonal frequency division multiplexing (OFDM) symbols and reference signals (RFs). A quantity of available REs across all slots may be a quantity of available resource elements in a first one of the plurality of slots multiplied by a quantity of slots or by a factor (e.g., quantity of scheduled slots, an indicated number, and/or the like).

In some aspects, different slots may include different structures in terms of a quantity of OFDM symbols and/or any configured/indicated RSs. For example, only the first slot may include DMRS symbols, or different slots may include different RS densities. UE 320 may calculate a quantity of available REs across all slots, considering different structures across different slots.

As indicated above, FIG. 3 is provided as an example. Other examples may differ from what is described with respect to FIG. 3.

Figure 4:
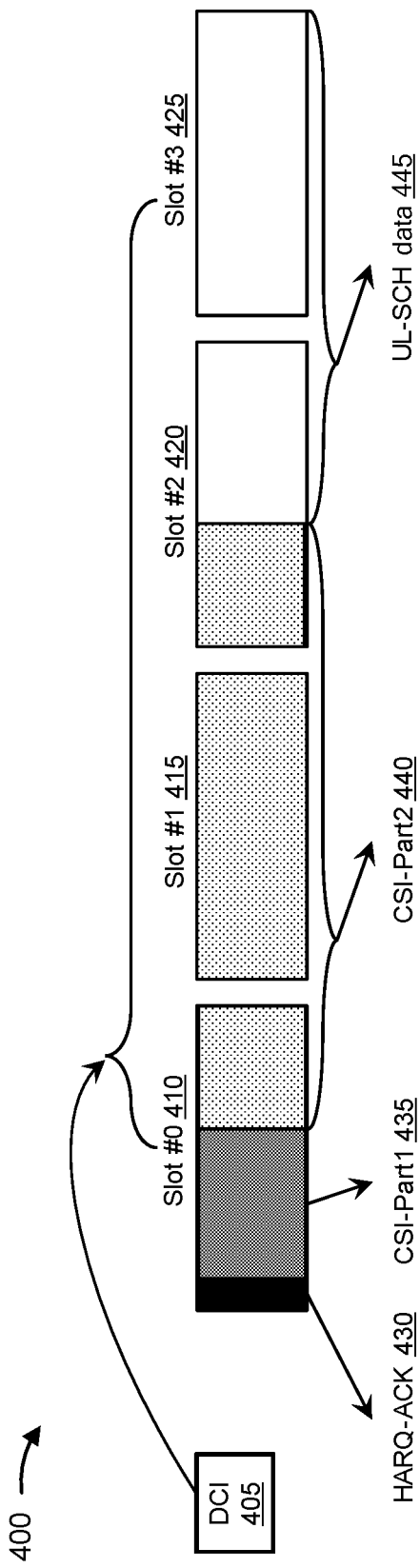
FIG. 4 shows an example of multi-slot CSI and UL-SCH multiplexing, in accordance with various aspects of the present disclosure.

FIG. 4 shows an example 400 of multi-slot CSI and UL-SCH multiplexing, in accordance with various aspects of the present disclosure.

As shown in FIG. 4, a DCI message 405 may include a schedule for multiple slots, Slot #0 410, Slot #1 415, Slot #2 420, and Slot #3 425. The schedule may indicate a location of a HARQ-ACK 430, a CSI-Part1 435, a CSI-Part2 440, and UL-SCH data 445. In some aspects, the UCI components may be multiplexed firstly onto Slot #0 410, then onto Slot #1 415, and so forth, until a determined quantity of REs for each UCI component is met. For example, as shown in FIG. 4, Slot #0 410 includes HARQ-ACK 430, CSI-Part1 435, and a portion of CSI-Part2 440. Slot #1 415 includes a continuing portion of CSI-Part2 440. Slot #2 420 includes a last portion of CSI-Part 2 440 and a first portion of UL-SCH 445. Slot #3 425 includes UL-SCH data 445. In some aspects, there may be just two PUSCH slots in total, where a first slot includes only UCI components and a second slot includes only UL-SCH data. CSI-Part2 omission may be carried out where a quantity of REs available for a single PUSCH slot is replaced by a quantity of REs available across all scheduled PUSCH slots.

In some aspects, if UL-SCH data is also multiplexed onto the PUSCH, the value of $Q_{Beta-Part2} = \lceil (O_{Part2} + L_{Part2}) \times \beta_{Part2} \times Q_{PUSCH}/K_{tot} \rceil$, where the value of $Q_{PUSCH}$ is with respect to a single PUSCH slot. Multiple slots may include the same quantity of available REs, and UE 320 may multiplex the quantity of available REs by a factor of S (e.g., quantity of scheduled slots) on top of $Q_{PUSCH}$. In some aspects, if only a first slot includes DMRS symbols, then a quantity of available REs may be different for different slots. UE 320 may multiplex by a factor of S on top of $Q_{PUSCH}$ to calculate a total quantity of available REs across all PUSCH slots. UE 320 may count the quantity of REs slot by slot.

In some aspects, each PUSCH slot may include multiplexed components of UCI. UE 320 may determine a quantity of REs for a particular component of the UCI based at least in part on a Beta_Offset value and/or a scaling factor. UE 320 may map each component to REs of a first slot and then to REs of a second slot, and so forth.

In some aspects, in order to reduce a computational complexity of UE 320, UE 320 may schedule multiple slots that include identical structures, in terms of ODFM symbols and RSs. UE 320 may perform a calculation of a quantity of REs available for each component in a first slot and use the calculation for each component in all other slots.

As indicated above, FIG. 4 is provided as an example. Other examples may differ from what is described with respect to FIG. 4.

Figure 5:
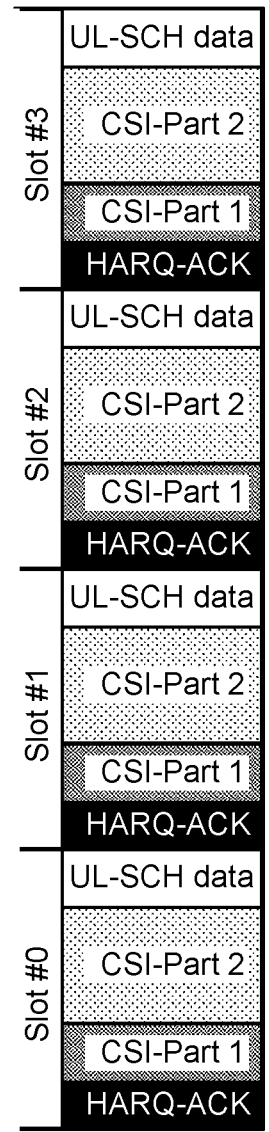
FIG. 5 shows an example of multi-slot CSI and UL-SCH multiplexing, in accordance with various aspects of the present disclosure.

FIG. 5 shows an example 500 of multi-slot CSI and UL-SCH multiplexing, in accordance with various aspects of the present disclosure.

As shown in FIG. 5, a quantity of REs for HARQ-ACK is the same across the slots, a quantity of REs for CSI-Part1 is the same across the slots, a quantity of REs for CSI-Part2 is the same across the slots, and a quantity of REs for UL-SCH data is the same across the slots.

As indicated above, FIG. 5 is provided as an example. Other examples may differ from what is described with respect to FIG. 5.

Figure 6:
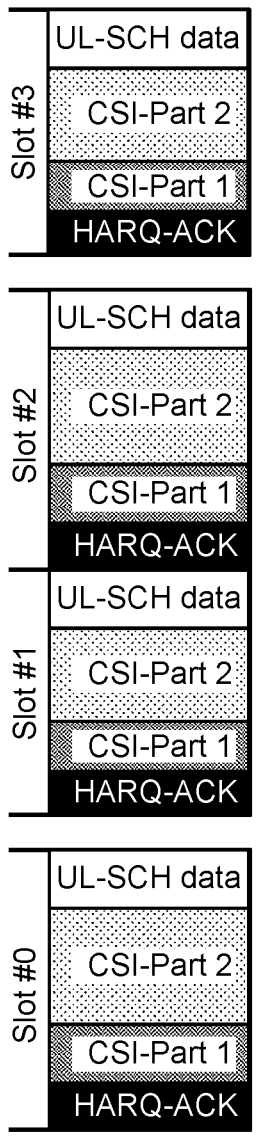
FIG. 6 shows an example of multi-slot CSI and UL-SCH multiplexing, in accordance with various aspects of the present disclosure.

FIG. 6 shows an example 600 of multi-slot CSI and UL-SCH multiplexing, in accordance with various aspects of the present disclosure.

In some aspects, the calculation of the quantity of REs for each component is slot-specific. As shown in FIG. 6, the quantity of REs for HARQ-ACK is the same across the slots. However, the quantity of REs for CSI-Part1 may be different between Slot #0 and Slot #1. The quantity of REs for CSI-Part1 may be the same for Slot #0 and Slot #2. The quantity of REs for CSI-Part2 may be greater for Slot #0 and Slot #2 than for Slot #1 and Slot #3. The quantity of REs for the UL-SCH data may be similar across the slots.

As indicated above, FIG. 6 is provided as an example. Other examples may differ from what is described with respect to FIG. 6.

Figure 7:
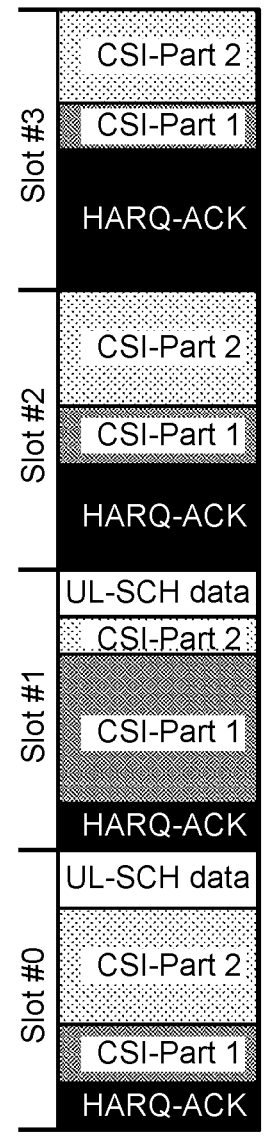
FIG. 7 shows an example of multi-slot CSI and UL-SCH multiplexing, in accordance with various aspects of the present disclosure.

FIG. 7 shows an example 700 of multi-slot CSI and UL-SCH multiplexing, in accordance with various aspects of the present disclosure.

In some aspects, the calculation of the quantity of REs for each component is slot specific, where some slots may include a component of UCI not included in other slots. As shown in FIG. 7, the quantity of REs for HARQ-ACK is the same for Slot #0 and Slot #1 but greater for Slot #2 and Slot #3. The quantity of REs for CSI-Part1 may be greater for Slot #2 than for Slot #0, Slot #1, and Slot #3. The quantity of REs for CSI-Part2 may be greater for Slot #0 and Slot #2 than for Slot #1 and Slot #3. Notable in FIG. 7 is that Slot #0 and Slot #1 include the UL-SCH data, while Slot #2 and Slot #3 do not include the UL-SCH data.

As indicated above, FIG. 7 is provided as an example. Other examples may differ from what is described with respect to FIG. 7.

Figure 8:
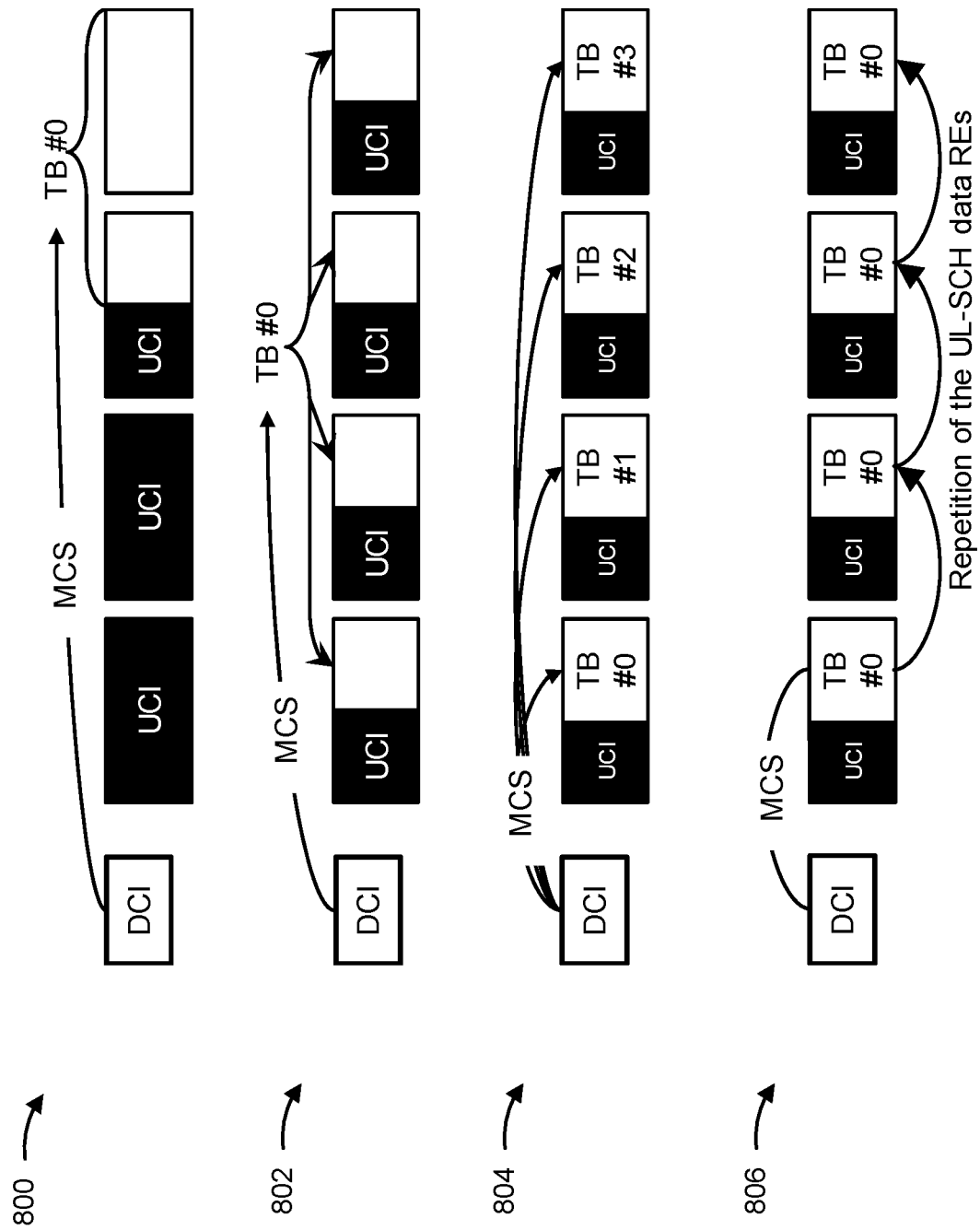
FIG. 8 shows one or more examples of schedules for multi-slot CSI and UL-SCH multiplexing, in accordance with various aspects of the present disclosure.

FIG. 8 shows one or more examples 800, 802, 804, 806 of schedules for multi-slot CSI and UL-SCH multiplexing, in accordance with various aspects of the present disclosure.

In some aspects, UE 320 may multiplex UCI and transport blocks (TBs) across multiple slots. The TBs may include the UL-SCH data. As shown by schedule 800 in FIG. 8, UE 320 may map the UL-SCH data to REs that remain after UE 320 fills a first few slots with the components of the UCI. UE 320 may determine a size of a TB based at least in part on a quantity of remaining REs across all the slots. In some aspects, the UL-SCH data may be included in a single TB that is mapped to remaining REs across the slots. As shown by schedule 802, the single TB may be mapped to the remaining REs of each respective slot.

As shown by schedule 804, the UL-SCH data may be divided into multiple TBs, wherein each TB is mapped to the remaining REs of each respective slot. Each TB size may be determined based at least in part on a quantity of remaining REs in the respective slot. A coding rate for a modulation and coding scheme (MCS) of different TBs may also be different for different slots. UE 320 may configure the coding rate based at least in part on an RRC message or an UL grant.

In some aspects, if different slots include the same Beta_Offset values and/or the same scaling factor, the UL-SCH data may be in a single TB. As shown by schedule 806, this single TB may be repetitively mapped to remaining REs of each slot. The TB size may be determined based at least in part on a quantity of remaining REs in a slot. The TB size of the UL-SCH data may also be determined based at least in part on the MCS indicated in the UL grant DCI. A single DCI message may indicate a schedule for multiplexing, into multiple slots, UL-SCH data and UCI that includes CSI reporting for multiple TRPs, saving DCI overhead.

As indicated above, FIG. 8 is provided as an example. Other examples may differ from what is described with respect to FIG. 8.

Figure 9:
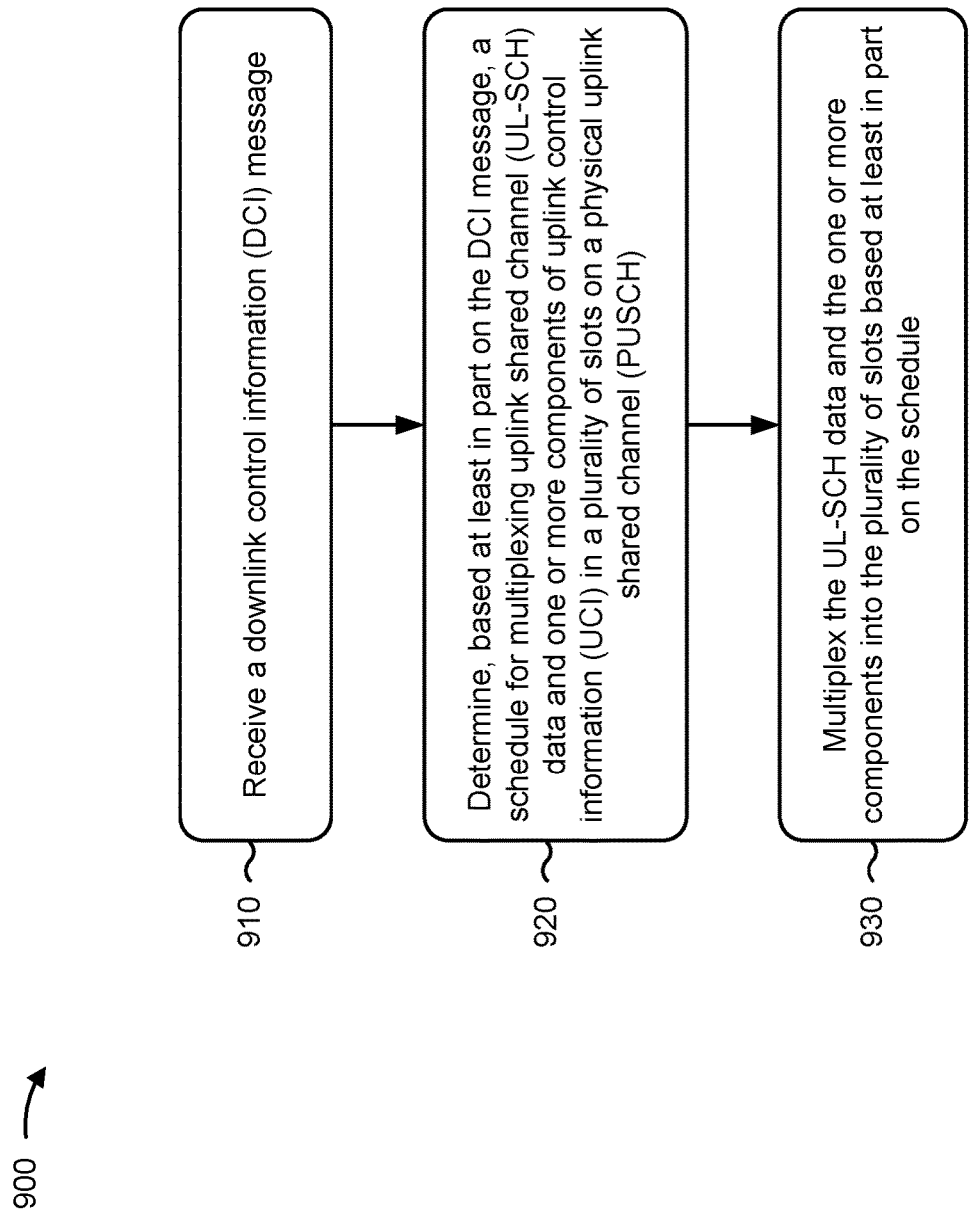
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1 and 2, UE 320 depicted in FIG. 3, and/or the like) performs operations associated with multi-slot CSI and UL-SCH multiplexing.

As shown in FIG. 9, in some aspects, process 900 may include receiving a DCI message (block 910). For example, the UE (e.g., using receive processor 258, transmit processor 264, controller/processor 280, memory 282, and/or the like) may receive a DCI message, as described above.

As further shown in FIG. 9, in some aspects, process 900 may include determining, based at least in part on the DCI message, a schedule for multiplexing UL-SCH data and one or more components of UCI in a plurality of slots on a PUSCH (block 920). For example, the UE (e.g., using receive processor 258, transmit processor 264, controller/processor 280, memory 282, and/or the like) may determine, based at least in part on the DCI message, a schedule for multiplexing UL-SCH data and one or more components of UCI in a plurality of slots on a PUSCH, as described above. In some aspects, the one or more components may include a CSI report for a plurality of transmission reception points.

As further shown in FIG. 9, in some aspects, process 900 may include multiplexing the UL-SCH data and the one or more components into the plurality of slots based at least in part on the schedule (block 930). For example, the UE (e.g., using receive processor 258, transmit processor 264, controller/processor 280, memory 282, and/or the like) may multiplex the UL-SCH data and the one or more components into the plurality of slots based at least in part on the schedule, as described above.

Process 900 may include additional aspects, such as any single aspect or any combination of aspects described below and/or in connection with one or more other processes described elsewhere herein.

In a first aspect, the schedule includes a quantity of resource elements and a slot location for the UL-SCH data and the one or more components.

In a second aspect, alone or in combination with the first aspect, determining the schedule includes determining a quantity of resource elements for the one or more components based at least in part on one or more of a beta offset value or a scaling factor indicated in the DCI message.

In a third aspect, alone or in combination with one or more of the first and second aspects, process 900 includes configuring the UE to multiplex the UL-SCH data and the one or more components into the plurality of slots based at least in part on receiving one or more of an RRC message or an UL grant.

In a fourth aspect, alone or in combination with one or more of the first through third aspects, the UL grant includes one or more of a valid CSI request indication or a negative UL-SCH data transmission indication.

In a fifth aspect, alone or in combination with one or more of the first through fourth aspects, process 900 includes determining a quantity of the plurality of slots to be scheduled in one of an uplink grant, the DCI message, a radio resource control message, or stored configuration information In a sixth aspect, alone or in combination with one or more of the first through fifth aspects, process 900 includes transmitting a UE capability message and receiving the schedule based at least in part on transmitting the UE capability message.

In a seventh aspect, alone or in combination with one or more of the first through sixth aspects, determining the schedule includes determining a quantity of resource elements for each of the one or more components based at least in part on a quantity of available resource elements across the plurality of slots.

In an eighth aspect, alone or in combination with one or more of the first through seventh aspects, each of the plurality of slots includes one or more of a same quantity of orthogonal frequency division multiplexing symbols or a same reference signal.

In a ninth aspect, alone or in combination with one or more of the first through eighth aspects, a quantity of available resource elements across the plurality of slots is a quantity of available resource elements in a first one of the plurality of slots multiplied by a quantity of the plurality of slots.

In a tenth aspect, alone or in combination with one or more of the first through ninth aspects, each of the plurality of slots includes one or more of a different quantity of orthogonal frequency division multiplexing symbols or a different reference signal.

In an eleventh aspect, alone or in combination with one or more of the first through tenth aspects, a quantity of available resource elements across the plurality of slots is based at least in part on the different quantity of orthogonal frequency division multiplexing symbols or the different reference signal.

In a twelfth aspect, alone or in combination with one or more of the first through eleventh aspects, the schedule includes multiplexing ones of the one or more components to fill a first one of the plurality of slots before continuing to multiplex other ones of the one or more components to fill a second one of the plurality of slots.

In a thirteenth aspect, alone or in combination with one or more of the first through twelfth aspects, a CSI part 2 omission is based at least in part on a quantity of available resource elements across the plurality of slots.

In a fourteenth aspect, alone or in combination with one or more of the first through thirteenth aspects, the schedule includes front-loading the one or more components into the plurality of slots such that the one or more components occupy resource elements of the plurality of slots earlier than the UL-SCH data.

In a fifteenth aspect, alone or in combination with one or more of the first through fourteenth aspects, the schedule includes multiplexing available resource elements across the plurality of slots, where a quantity of the available resource elements is a quantity of available resource elements in a first one of the plurality of slots multiplied by a factor.

In a sixteenth aspect, alone or in combination with one or more of the first through fifteenth aspects, a first one of the plurality of slots includes the one or more components and no UL-SCH data, and a second one of the plurality of slots includes the UL-SCH data and none of the one or more components.

In a seventeenth aspect, alone or in combination with one or more of the first through sixteenth aspects, determining the schedule includes determining a quantity of resource elements for each of the one or more components based at least in part on one or more of a beta offset value or a scaling factor indication.

In an eighteenth aspect, alone or in combination with one or more of the first through seventeenth aspects, each of the plurality of slots includes a first quantity of resource elements for a first one of the one or more components and a second quantity of resource elements for a second one of the one or more components, and the schedule includes multiplexing the first one of the one or more components into the first quantity of resource elements and the second one of the one or more components into the second quantity of resource elements.

In a nineteenth aspect, alone or in combination with one or more of the first through eighteenth aspects, each of the plurality of slots includes one or more of a same quantity of orthogonal frequency division multiplexing symbols or a same reference signal.

In a twentieth aspect, alone or in combination with one or more of the first through nineteenth aspects, a quantity of resource elements for the first one of the one or more components is a same quantity in each of the plurality of slots, and a quantity of resource elements for the second one of the one or more components is a same quantity for each of the plurality of slots.

In a twenty first aspect, alone or in combination with one or more of the first through twentieth aspects, each of the plurality of slots includes one or more of a different quantity of orthogonal frequency division multiplexing symbols or a different reference signal.

In a twenty second aspect, alone or in combination with one or more of the first through twenty first aspects, a quantity of resource elements for the first one of the one or more components and a quantity of resource elements for the second one of the one or more components is configured for each of the plurality of slots.

In a twenty third aspect, alone or in combination with one or more of the first through twenty second aspects, the plurality of slots have different beta offset values or different scaling factors based at least in part on a radio resource control message or an uplink grant.

In a twenty fourth aspect, alone or in combination with one or more of the first through twenty third aspects, at least one of the plurality of slots includes no UL-SCH data.

In a twenty fifth aspect, alone or in combination with one or more of the first through twenty fourth aspects, a first set of resource elements in each respective slot of the plurality of slots includes a hybrid automatic repeat request acknowledgement, a second set of resource elements of the respective slot includes CSI part 1 data, a third set of resource elements of the respective slot includes CSI part 2 data, and a fourth set of resource elements of the respective slot includes the UL-SCH data.

In a twenty sixth aspect, alone or in combination with one or more of the first through twenty fifth aspects, the schedule includes multiplexing the UL-SCH data in one or more transport blocks in the plurality of slots after multiplexing the one or more components in the plurality of slots.

In a twenty seventh aspect, alone or in combination with one or more of the first through twenty sixth aspects, a transport block size of a transport block is based at least in part on a quantity of resource elements across the plurality of slots.

In a twenty eighth aspect, alone or in combination with one or more of the first through twenty seventh aspects, the schedule includes multiplexing the UL-SCH data in a transport block and multiplexing the UL-SCH data in resource elements that remain in the plurality of slots after multiplexing the one or more components in the plurality of slots.

In a twenty ninth aspect, alone or in combination with one or more of the first through twenty eighth aspects, a transport block size, of the transport block, is based at least in part on a quantity of resource elements across the plurality of slots.

In a thirtieth aspect, alone or in combination with one or more of the first through twenty ninth aspects, the schedule includes multiplexing the UL-SCH data into a plurality of transport blocks and multiplexing each transport block into resource elements that remain in the plurality of slots after multiplexing the one or more components into the plurality of slots.

In a thirty first aspect, alone or in combination with one or more of the first through thirtieth aspects, a transport block size, of each of the plurality of transport blocks, is based at least in part on a quantity of resource elements in a respective one of the plurality of slots.

In a thirty second aspect, alone or in combination with one or more of the first through thirty first aspects, the plurality of slots have a same beta offset value or a same scaling factor, and the schedule includes multiplexing the UL-SCH data in a transport block and multiplexing the transport block in resource elements that remain in each respective slot of the plurality of slots after multiplexing the one or more components in the respective slot.

In a thirty third aspect, alone or in combination with one or more of the first through thirty second aspects, a transport block size, of the transport block, is based at least in part on a quantity of resource elements in the respective slot.

In a thirty fourth aspect, alone or in combination with one or more of the first through thirty third aspects, a transport block size of the UL-SCH data is based at least in part on a modulation and coding scheme indicated in an uplink grant downlink control information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
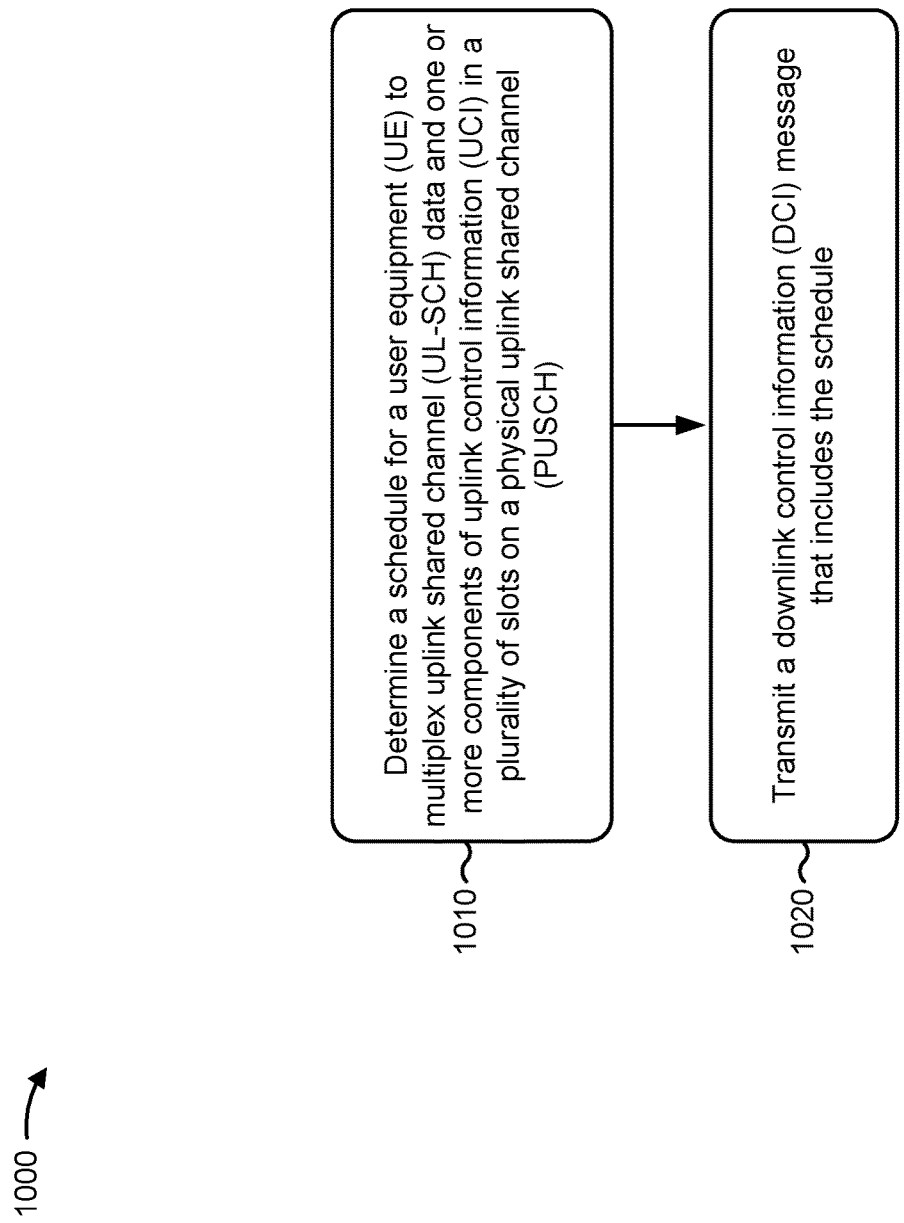
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., BS 110 depicted in FIGS. 1 and 2, BS 310 depicted in FIG. 3, and/or the like) performs operations associated with multi-slot CSI and UL-SCH data multiplexing.

As shown in FIG. 10, in some aspects, process 1000 may include determining a schedule for a UE to multiplex UL-SCH data and one or more components of UCI in a plurality of slots on a PUSCH (block 1010). For example, the base station (e.g., using transmit processor 220, receive processor 238, controller/processor 240, memory 242, and/or the like) may determine a schedule for a UE to multiplex UL-SCH data and one or more components of UCI in a plurality of slots on a PUSCH, as described above. In some aspects, the one or more components may include a CSI report for a plurality of transmission reception points.

As further shown in FIG. 10, in some aspects, process 1000 may include transmitting a DCI message that includes the schedule (block 1020). For example, the base station (e.g., using transmit processor 220, receive processor 238, controller/processor 240, memory 242, and/or the like) may transmit a DCI message that includes the schedule, as described above.

Process 1000 may include additional aspects, such as any single aspect or any combination of aspects described below and/or in connection with one or more other processes described elsewhere herein.

In a first aspect, the schedule includes a quantity of resource elements and a slot location for the UL-SCH data and the one or more components.

In a second aspect, alone or in combination with the first aspect, the DCI message includes one or more of a beta offset value or a scaling factor.

In a third aspect, alone or in combination with one or more of the first and second aspects, process 1000 includes transmitting an RRC message or an UL grant to the UE that indicates a configuration for multiplexing the UL-SCH data and the one or more components into the plurality of slots.

In a fourth aspect, alone or in combination with one or more of the first through third aspects, the UL grant includes one or more of a valid CSI request indication or a negative UL-SCH data transmission indication.

In a fifth aspect, alone or in combination with one or more of the first through fourth aspects, process 1000 includes configuring the UE to determine a quantity of the plurality of slots to be scheduled in one of an uplink grant, the DCI message, a radio resource control message, or stored configuration information.

In a sixth aspect, alone or in combination with one or more of the first through fifth aspects, determining the schedule includes determining the schedule based at least in part on the UE capability message.

In a seventh aspect, alone or in combination with one or more of the first through sixth aspects, process 1000 includes configuring the UE to determine a quantity of resource elements for each of the one or more components based at least in part on a quantity of available resource elements across the plurality of slots.

In an eighth aspect, alone or in combination with one or more of the first through seventh aspects, each of the plurality of slots includes one or more of a same quantity of orthogonal frequency division multiplexing symbols or a same reference signal.

In a ninth aspect, alone or in combination with one or more of the first through eighth aspects, a quantity of available resource elements across the plurality of slots is a quantity of available resource elements in a first one of the plurality of slots multiplied by a quantity of the plurality of slots.

In a tenth aspect, alone or in combination with one or more of the first through ninth aspects, each of the plurality of slots includes one or more of a different quantity of orthogonal frequency division multiplexing symbols or a different reference signal.

In an eleventh aspect, alone or in combination with one or more of the first through tenth aspects, a quantity of available resource elements across the plurality of slots is based at least in part on the different quantity of orthogonal frequency division multiplexing symbols or the different reference signal.

In a twelfth aspect, alone or in combination with one or more of the first through eleventh aspects, the schedule includes multiplexing ones of the one or more components to fill a first one of the plurality of slots before continuing to multiplex other ones of the one or more components to fill a second one of the plurality of slots.

In a thirteenth aspect, alone or in combination with one or more of the first through twelfth aspects, a CSI part 2 omission is based at least in part on a quantity of available resource elements across the plurality of slots.

In a fourteenth aspect, alone or in combination with one or more of the first through thirteenth aspects, the schedule includes front-loading the one or more components into the plurality of slots such that the one or more components occupy resource elements of the plurality of slots earlier than the UL-SCH data.

In a fifteenth aspect, alone or in combination with one or more of the first through fourteenth aspects, the schedule includes multiplexing available resource elements across the plurality of slots, where a quantity of the available resource elements is a quantity of available resource elements in a first one of the plurality of slots multiplied by a factor.

In a sixteenth aspect, alone or in combination with one or more of the first through fifteenth aspects, a first one of the plurality of slots includes the one or more components and no UL-SCH data, and a second one of the plurality of slots includes the UL-SCH data and none of the one or more components.

In a seventeenth aspect, alone or in combination with one or more of the first through sixteenth aspects, process 1000 includes configuring the UE to determine the schedule by determining a quantity of resource elements for each of the one or more components based at least in part on one or more of a beta offset value or a scaling factor indication.

In an eighteenth aspect, alone or in combination with one or more of the first through seventeenth aspects, each of the plurality of slots includes a first quantity of resource elements for a first one of the one or more components and a second quantity of resource elements for a second one of the one or more components, and the schedule includes multiplexing the first one of the one or more components into the first quantity of resource elements and the second one of the one or more components into the second quantity of resource elements.

In a nineteenth aspect, alone or in combination with one or more of the first through eighteenth aspects, each of the plurality of slots includes one or more of a same quantity of orthogonal frequency division multiplexing symbols or a same reference signal.

In a twentieth aspect, alone or in combination with one or more of the first through nineteenth aspects, a quantity of resource elements for the first one of the one or more components is a same quantity in each of the plurality of slots, and a quantity of resource elements for the second one of the one or more components is a same quantity for each of the plurality of slots.

In a twenty first aspect, alone or in combination with one or more of the first through twentieth aspects, each of the plurality of slots includes one or more of a different quantity of orthogonal frequency division multiplexing symbols or a different reference signal.

In a twenty second aspect, alone or in combination with one or more of the first through twenty first aspects, a quantity of resource elements for the first one of the one or more components and a quantity of resource elements for the second one of the one or more components is configured for each of the plurality of slots.

In a twenty third aspect, alone or in combination with one or more of the first through twenty second aspects, process 1000 includes transmitting a radio resource control message or an uplink grant indicating that the plurality of slots have different beta offset values or different scaling factors.

In a twenty fourth aspect, alone or in combination with one or more of the first through twenty third aspects, at least one of the plurality of slots includes no UL-SCH data.

In a twenty fifth aspect, alone or in combination with one or more of the first through twenty fourth aspects, a first set of resource elements in each respective slot of the plurality of slots includes a hybrid automatic repeat request acknowledgement, a second set of resource elements of the respective slot includes CSI part 1 data, a third set of resource elements of the respective slot includes CSI part 2 data, and a fourth set of resource elements of the respective slot includes the UL-SCH data.

In a twenty sixth aspect, alone or in combination with one or more of the first through twenty fifth aspects, the schedule includes multiplexing the UL-SCH data in one or more transport blocks in the plurality of slots after multiplexing the one or more components in the plurality of slots.

In a twenty seventh aspect, alone or in combination with one or more of the first through twenty sixth aspects, a transport block size of a transport block is based at least in part on a quantity of resource elements across the plurality of slots.

In a twenty eighth aspect, alone or in combination with one or more of the first through twenty seventh aspects, the schedule includes multiplexing the UL-SCH data in a transport block and multiplexing the UL-SCH data in resource elements that remain in the plurality of slots after multiplexing the one or more components in the plurality of slots.

In a twenty ninth aspect, alone or in combination with one or more of the first through twenty eighth aspects, a transport block size, of the transport block, is based at least in part on a quantity of resource elements across the plurality of slots.

In a thirtieth aspect, alone or in combination with one or more of the first through twenty ninth aspects, the schedule includes multiplexing the UL-SCH data into a plurality of transport blocks and multiplexing each transport block into resource elements that remain in the plurality of slots after multiplexing the one or more components into the plurality of slots.

In a thirty first aspect, alone or in combination with one or more of the first through thirtieth aspects, a transport block size, of each of the plurality of transport blocks, is based at least in part on a quantity of resource elements in a respective one of the plurality of slots.

In a thirty second aspect, alone or in combination with one or more of the first through thirty first aspects, the plurality of slots have a same beta offset value or a same scaling factor, and the schedule includes multiplexing the UL-SCH data in a transport block and multiplexing the transport block in resource elements that remain in each respective slot of the plurality of slots after multiplexing the one or more components in the respective slot.

In a thirty third aspect, alone or in combination with one or more of the first through thirty second aspects, a transport block size, of the transport block, is based at least in part on a quantity of resource elements in the respective slot.

In a thirty fourth aspect, alone or in combination with one or more of the first through thirty third aspects, a transport block size of the UL-SCH data is based at least in part on a modulation and coding scheme indicated in an uplink grant downlink control information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" that is used to describe internal components of base station 110 and UE 120 is intended to be broadly construed as hardware, firmware, and/or a combination of hardware and software. As used herein, a processor is implemented in hardware, firmware, and/or a combination of hardware and software. The term "component" that is used to describe portions of the UCI is intended to be construed as data or information.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving a downlink control information (DCI) message;
    determining, based at least in part on the DCI message, a schedule for multiplexing uplink shared channel (UL-SCH) data and one or more components of uplink control information (UCI) in a plurality of slots on a physical uplink shared channel (PUSCH), wherein the one or more components include a channel state information (CSI) report for a plurality of transmission reception points; and
    multiplexing the UL-SCH data and the one or more components in the plurality of slots based at least in part on the schedule, wherein each of the plurality of slots includes a first quantity of resource elements for a first one of the one or more components and a second quantity of resource elements for a second one of the one or more components.

2. The method of claim 1, wherein the schedule includes a quantity of resource elements and a slot location for the UL-SCH data and the one or more components.

3. The method of claim 1, wherein determining the schedule includes determining a quantity of resource elements for the one or more components based at least in part on one or more of a beta offset value or a scaling factor indicated in the DCI message.

4. The method of claim 1, further comprising configuring the UE to multiplex the UL-SCH data and the one or more components in the plurality of slots based at least in part on receiving one or more of a radio resource control (RRC) message or an uplink (UL) grant.

5. The method of claim 4, wherein the UL grant includes one or more of a valid CSI request indication or a negative UL-SCH data transmission indication.

6. The method of claim 1, further comprising determining a quantity of the plurality of slots to be scheduled in one of an uplink grant, the DCI message, a radio resource control message, or stored configuration information.

7. The method of claim 1, further comprising:
    transmitting a UE capability message; and
    receiving the schedule based at least in part on transmitting the UE capability message.

8. The method of claim 1, wherein determining the schedule includes determining the first quantity of resource elements and the second quantity of resource elements based at least in part on a quantity of available resource elements across the plurality of slots.

9. The method of claim 1, wherein the each of the plurality of slots includes one or more of a same quantity of orthogonal frequency division multiplexing symbols or a same reference signal.

10. The method of claim 9, wherein a quantity of available resource elements across the plurality of slots is a quantity of available resource elements in a first one of the plurality of slots multiplied by a quantity of the plurality of slots.

11. The method of claim 1, wherein the each of the plurality of slots includes one or more of a different quantity of orthogonal frequency division multiplexing symbols or a different reference signal.

12. The method of claim 11, wherein a quantity of available resource elements across the plurality of slots is based at least in part on the different quantity of orthogonal frequency division multiplexing symbols or the different reference signal.

13. The method of claim 1, wherein determining the schedule includes determining a quantity of resource elements for each of the one or more components based at least in part on one or more of a beta offset value or a scaling factor indication.

14. The method of claim 1, wherein the schedule includes multiplexing the first one of the one or more components in the first quantity of resource elements and the second one of the one or more components in the second quantity of resource elements.

15. The method of claim 1, wherein the each of the plurality of slots includes one or more of a same quantity of orthogonal frequency division multiplexing symbols or a same reference signal.

16. The method of claim 1, wherein the first quantity of resource elements for the first one of the one or more components is a same quantity in the each of the plurality of slots, and wherein the second quantity of resource elements for the second one of the one or more components is another same quantity in the each of the plurality of slots.

17. The method of claim 1, wherein the each of the plurality of slots includes one or more of a different quantity of orthogonal frequency division multiplexing symbols or a different reference signal.

18. The method of claim 1, wherein the first quantity of resource elements for the first one of the one or more components and the second quantity of resource elements for the second one of the one or more components is configured for the each of the plurality of slots.

19. The method of claim 1, wherein the plurality of slots have different beta offset values or different scaling factors based at least in part on a radio resource control message or an uplink grant.

20. The method of claim 1, wherein at least one of the plurality of slots includes no UL-SCH data.

21. The method of claim 1, wherein the plurality of slots have a same beta offset value or a same scaling factor, and wherein the schedule includes multiplexing the UL-SCH data in a transport block and multiplexing the transport block in resource elements that remain in each respective slot of the plurality of slots after multiplexing the one or more components in the respective slot.

22. The method of claim 21, wherein a transport block size, of the transport block, is based at least in part on a quantity of resource elements in the respective slot.

23. A method of wireless communication performed by a network entity, comprising:
determining a schedule for a user equipment (UE) to multiplex uplink shared channel (UL-SCH) data and one or more components of uplink control information (UCI) in a plurality of slots on a physical uplink shared channel (PUSCH), wherein the one or more components include a channel state information (CSI) report for a plurality of transmission reception points; and
transmitting a downlink control information (DCI) message that includes the schedule, wherein each of the plurality of slots includes a first quantity of resource elements for a first one of the one or more components and a second quantity of resource elements for a second one of the one or more components.

24. The method of claim 23, wherein the DCI message includes one or more of a beta offset value or a scaling factor.

25. The method of claim 23, further comprising configuring the UE to determine a quantity of resource elements for each of the one or more components based at least in part on a quantity of available resource elements across the plurality of slots.

26. The method of claim 23, wherein the each of the plurality of slots includes one or more of a same quantity of orthogonal frequency division multiplexing symbols or a same reference signal.

27. The method of claim 23, wherein the each of the plurality of slots includes one or more of a different quantity of orthogonal frequency division multiplexing symbols or a different reference signal.

28. The method of claim 23, further comprising configuring the UE to determine the schedule by determining a quantity of resource elements for each of the one or more components based at least in part on one or more of a beta offset value or a scaling factor indication.

29. A user equipment (UE) for wireless communication, comprising:
one or more memories; and
one or more processors coupled to the one or more memories, the one or more memories comprising instructions executable by the one or more processors to cause the UE to:
receive a downlink control information (DCI) message;
determine, based at least in part on the DCI message, a schedule for multiplexing uplink shared channel (UL-SCH) data and one or more components of uplink control information (UCI) in a plurality of slots on a physical uplink shared channel (PUSCH), wherein the one or more components include a channel state information (CSI) report for a plurality of transmission reception points; and
multiplex the UL-SCH data and the one or more components in the plurality of slots based at least in part on the schedule, wherein each of the plurality of slots includes a first quantity of resource elements for a first one of the one or more components and a second quantity of resource elements for a second one of the one or more components.

30. A network entity for wireless communication, comprising:
one or more memories; and
one or more processors coupled to the one or more memories, the one or more memories comprising instructions executable by the one or more processors to cause the network entity to:
determine a schedule for a user equipment (UE) to multiplex uplink shared channel (UL-SCH) data and one or more components of uplink control information (UCI) in a plurality of slots on a physical uplink shared channel (PUSCH), wherein the one or more components include a channel state information (CSI) report for a plurality of transmission reception points; and
transmit a downlink control information (DCI) message that includes the schedule, wherein each of the plurality of slots includes a first quantity of resource elements for a first one of the one or more components and a second quantity of resource elements for a second one of the one or more components.

\* \* \* \* \*